(12) United States Patent
Sauerwein et al.

(10) Patent No.: US 9,615,331 B2
(45) Date of Patent: *Apr. 4, 2017

(54) POWER MANAGEMENT SCHEME FOR PORTABLE DATA COLLECTION DEVICES UTILIZING LOCATION AND POSITION SENSORS

(71) Applicant: Hand Held Products, Inc., Fort Mill, SC (US)

(72) Inventors: James T. Sauerwein, Charlotte, NC (US); Douglas M. Hinson, Monroe, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/164,924

(22) Filed: May 26, 2016

(65) Prior Publication Data

US 2016/0269997 A1    Sep. 15, 2016

Related U.S. Application Data

(63) Continuation of application No. 14/831,938, filed on Aug. 21, 2015, now Pat. No. 9,357,494, which is a
(Continued)

(51) Int. Cl.
*H04M 1/00* (2006.01)
*H04W 52/02* (2009.01)
(Continued)

(52) U.S. Cl.
CPC ...... *H04W 52/0254* (2013.01); *G06F 1/3203* (2013.01); *H04M 1/72569* (2013.01);
(Continued)

(58) Field of Classification Search
None
See application file for complete search history.

(56) References Cited

U.S. PATENT DOCUMENTS

| 5,224,151 A | 6/1993 | Bowen et al. |
| 5,268,564 A | 12/1993 | Metlitsky et al. |
| (Continued) | | |

FOREIGN PATENT DOCUMENTS

| CN | 1941980 A1 | 4/2007 |
| CN | 2919730 Y | 7/2007 |
| (Continued) | | |

OTHER PUBLICATIONS

Office Action in counterpart Chinese Application No. 201110035139.6 dated Nov. 27, 2013, pp. 1-6 with English translation provided.

(Continued)

*Primary Examiner* — Shantell L Heiber
(74) *Attorney, Agent, or Firm* — Additon, Higgins & Pendleton, P.A.

(57) ABSTRACT

A data collection device (DCD) is placed in a first low power mode after the DCD has been in a first predetermined position, and placed in a second low power mode after a first predetermined period of time. In another embodiment the DCD includes a wireless telephone, and a proximity sensor which detects when the DCD is close to a user's face, wherein the telephone is automatically put in a handset mode when the DCD is close to a user's face, and automatically put in a speakerphone mode when the DCD is not close to a user's face.

20 Claims, 8 Drawing Sheets

Related U.S. Application Data continuation of application No. 14/082,551, filed on Nov. 18, 2013, now Pat. No. 9,119,155, which is a continuation of application No. 12/689,521, filed on Jan. 19, 2010, now Pat. No. 8,588,869.

(51) Int. Cl.
  *G06F 1/32* (2006.01)
  *H04M 1/725* (2006.01)
  *H04W 4/02* (2009.01)

(52) U.S. Cl.
  CPC ......... *H04W 4/026* (2013.01); *H04W 52/027* (2013.01); *Y02B 60/50* (2013.01)

(56) References Cited

U.S. PATENT DOCUMENTS

| | | | |
|---|---|---|---|
| 5,481,733 | A | 1/1996 | Douglis et al. |
| 5,511,201 | A | 4/1996 | Kamimaki et al. |
| 5,926,404 | A | 7/1999 | Zeller et al. |
| 6,037,748 | A | 3/2000 | Yee et al. |
| 6,233,464 | B1 | 5/2001 | Chmaytelli |
| 6,374,169 | B1 * | 4/2002 | Demay ................. G06F 1/3215 307/10.1 |
| 6,452,494 | B1 | 9/2002 | Harrison |
| 6,883,016 | B1 | 4/2005 | Fujii et al. |
| 6,947,612 | B2 | 9/2005 | Helms et al. |
| 7,046,237 | B1 | 5/2006 | Nicolas et al. |
| 8,588,869 | B2 | 11/2013 | Sauerwein, Jr. et al. |
| 9,119,155 | B2 | 8/2015 | Sauerwein et al. |
| 2005/0114641 | A1 | 5/2005 | O'Connor et al. |
| 2005/0212749 | A1 | 9/2005 | Marvit et al. |
| 2005/0221791 | A1 | 10/2005 | Angelha |
| 2006/0116178 | A1 * | 6/2006 | Vuong ............. H04M 1/72566 455/574 |
| 2007/0057068 | A1 | 3/2007 | Tsai |
| 2007/0276583 | A1 | 11/2007 | Dobeck et al. |
| 2009/0044003 | A1 | 2/2009 | Berthiaume et al. |
| 2009/0099812 | A1 | 4/2009 | Kahn et al. |
| 2009/0100384 | A1 | 4/2009 | Louch |
| 2009/0160825 | A1 | 6/2009 | Payne |
| 2009/0200380 | A1 | 8/2009 | Longacre, Jr. et al. |
| 2009/0209293 | A1 | 8/2009 | Louch |
| 2009/0303205 | A1 | 12/2009 | Seibert et al. |
| 2010/0080084 | A1 | 4/2010 | Chen et al. |

FOREIGN PATENT DOCUMENTS

| | | |
|---|---|---|
| CN | 101237948 A | 8/2008 |
| CN | 102137189 A | 7/2011 |
| EP | 2345950 A2 | 7/2001 |

OTHER PUBLICATIONS

Intersil, "Introduction of Proximity Sensing", Application Note AN1436.0, dated Mar. 26, 2009, pp. 1-10.
Intersil, "Integrated Digital Ambient Light Sensor and Proximity Sensor, ISL29015", Data Sheet, Oct. 31, 2008 FN 65522.0, pp. 1-13.
EP Search Report in EP Application No. 11151459, dated Feb. 10, 2015, 3 pages.
Chinese Office Action (2nd issued) with Search Report for Application No. 201110035139.6, Dated Jul. 21, 2014, Provided with English Translation, 18 pages total.
Third Chinese Office Action with Supplemental search in Application No. 201110035139.6, dated Feb. 11, 2015, English Translation provided, 18 pages.
Exam Report in related EP Application 11151459.2, 5 pages, Dated Jul. 20, 2015 (reported Jul. 27, 2015).
Chinese Re-Examination Notice in related CN Application No. 201110035139.6, Dated May 30, 2016, 14 pages (English Machine Translation provided).

* cited by examiner

POWER MANAGEMENT SCHEME FOR PORTABLE DATA COLLECTION DEVICES UTILIZING LOCATION AND POSITION SENSORS

CROSS-REFERENCE TO RELATED APPLICATIONS

The present application claims the benefit of U.S. patent application Ser. No. 14/831,938 for a Power Management Scheme for Portable Data Collection Devices Utilizing Location and Position Sensors filed Aug. 21, 2015 (and published Dec. 24, 2015 as U.S. Patent Publication No. 2015/0373647), now U.S. Pat. No. 9,357,494, which claims the benefit of U.S. patent application Ser. No. 14/082,551 for a Power Management Scheme for Portable Data Collection Devices Utilizing Location and Position Sensors filed Nov. 18, 2013 (and published Mar. 6, 2014 as U.S. Patent Application Publication No. 2014/0066136), now U.S. Pat. No. 9,119,155, which claims the benefit of U.S. patent application Ser. No. 12/689,521 for a Power Management Scheme for Portable Data Collection Devices Utilizing Location and Position Sensors filed Jan. 19, 2010 (and published Jul. 21, 2011 as U.S. Patent Application Publication No. 2011/0177846), now U.S. Pat. No. 8,588,869. Each of the foregoing patent applications, patent publications, and patents is hereby incorporated by reference in its entirety.

FIELD OF THE INVENTION

This invention relates to the management of remote devices such as portable data terminals (PDTs), and more particularly to an interface for managing the remote devices.

BACKGROUND

Optimizing power management to maximize the available energy budget in portable data terminal is a constant struggle. Due to an increased peripheral set, ruggedized portable data terminals are particularly problematic with respect to power management issues. It is desirable to put the portable data terminal into a low power state whenever the operator is not actively using the device. Many systems implement time based inactivity determination. However, time based systems are much less efficient at managing energy consumption.

The remote devices can have the ability to have their configuration changed or to have a new application program installed while away from the central office. U.S. Patent Publication No. 2009/0044003 A1 to Berthiaume et al. teaches such a method, and is hereby incorporated by reference.

The remote devices can be managed by Remote Device Management (RDM) systems that allow an RDM user to manage the remote devices including updating configurations and device software, and to track problems which may be common to several devices, and provide fixes for these problems where feasible.

However, some RDM systems accumulate vast amounts of diagnostic and performance data. Organizing the data in a clear, concise, meaningful, and intuitive way on the graphical user interface of a computer display is a problem. Either too much data is presented so as to be cluttered and confusing, or the user has to navigate through multiple, sometimes non-intuitive, dialogs to access desired information.

It will be appreciated that for purposes of clarity and where deemed appropriate, reference numerals have been repeated in the figures to indicate corresponding features. Also, the relative size of various objects in the drawings has in some cases been distorted to more clearly show the invention.

DETAILED DESCRIPTION

Figure 1:
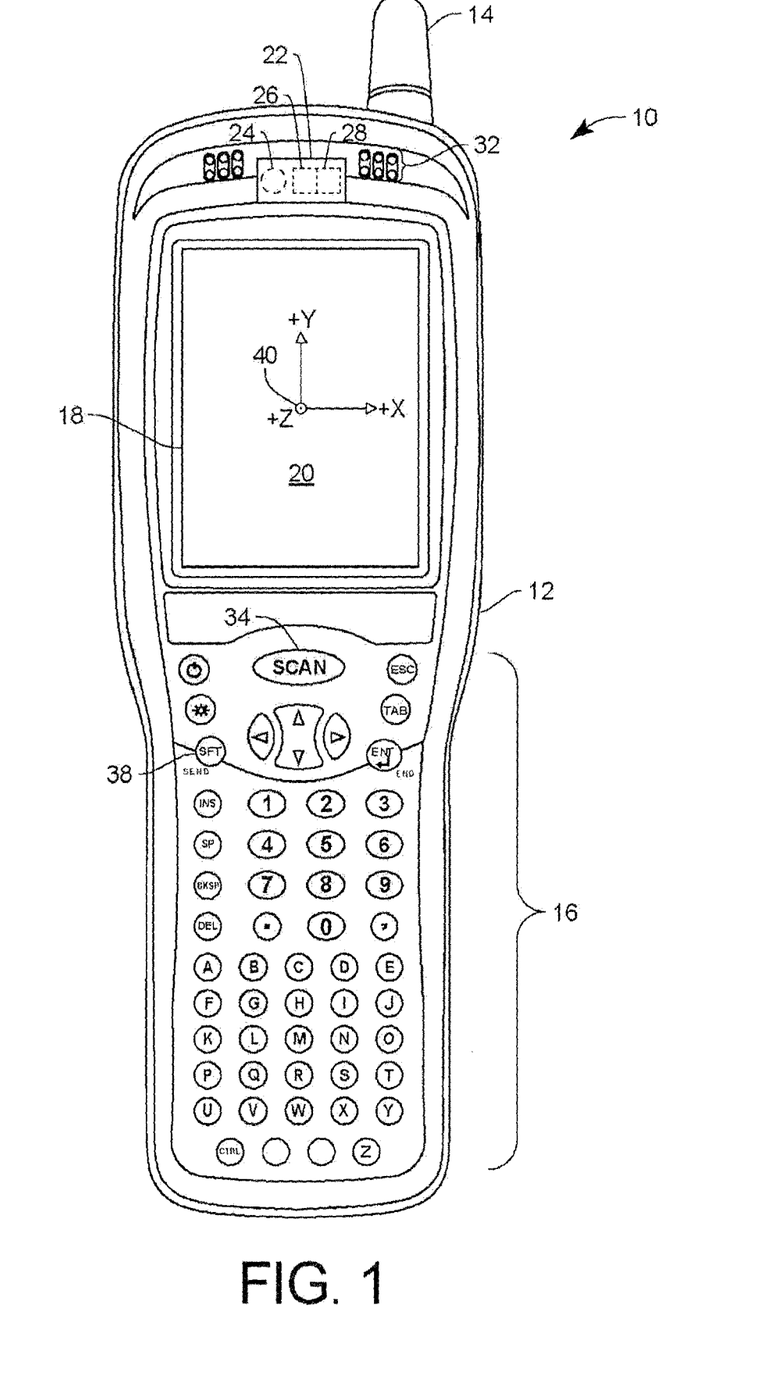
FIG. 1 is a front view of a data collection device (DCD) according to one embodiment of the present invention.

Turning now to the drawings, FIG. 1 shows a data collection device (DCD) 10, which may be a Personal Digital Assistant (PDA), according to one embodiment of the present invention. The DCD 10 has a main body 12 with an antenna 14 attached to the main body 12. A keypad 16 is located in the lower portion of the DCD 10, and a display 18 is located in an upper portion of the DCD 10. A touch sensitive panel 20 is superimposed on the display 18 for allowing a user to select options on the display directly.

Located above the display 18 is a combination ambient light sensor and proximity sensor 22, which may include a LED 24, a combination photodiode array and optical filter 26 to detect the amount of ambient light in the wavelengths detected by the human eye, and a second combination photodiode array and optical filter 28 to detect the amount of light in the infrared range which is used for proximity detection. Located slightly above and to the right of the combination ambient light sensor and proximity sensor 22 is a handset speaker 30 (shown in FIG. 2) located behind six holes 32. The keypad 16 includes a scan key 34 for activating a bar code scanner built into the DCD 10. The keypad 16 also includes a send key 38 which may be used to begin a conversation with a wireless telephone built into the DCD 10. Also shown in FIG. 1 is a three axis diagram 40 indicating the orientation of a three axis accelerometer 42 (shown in FIG. 2) built into the DCD 10.

Figure 2:
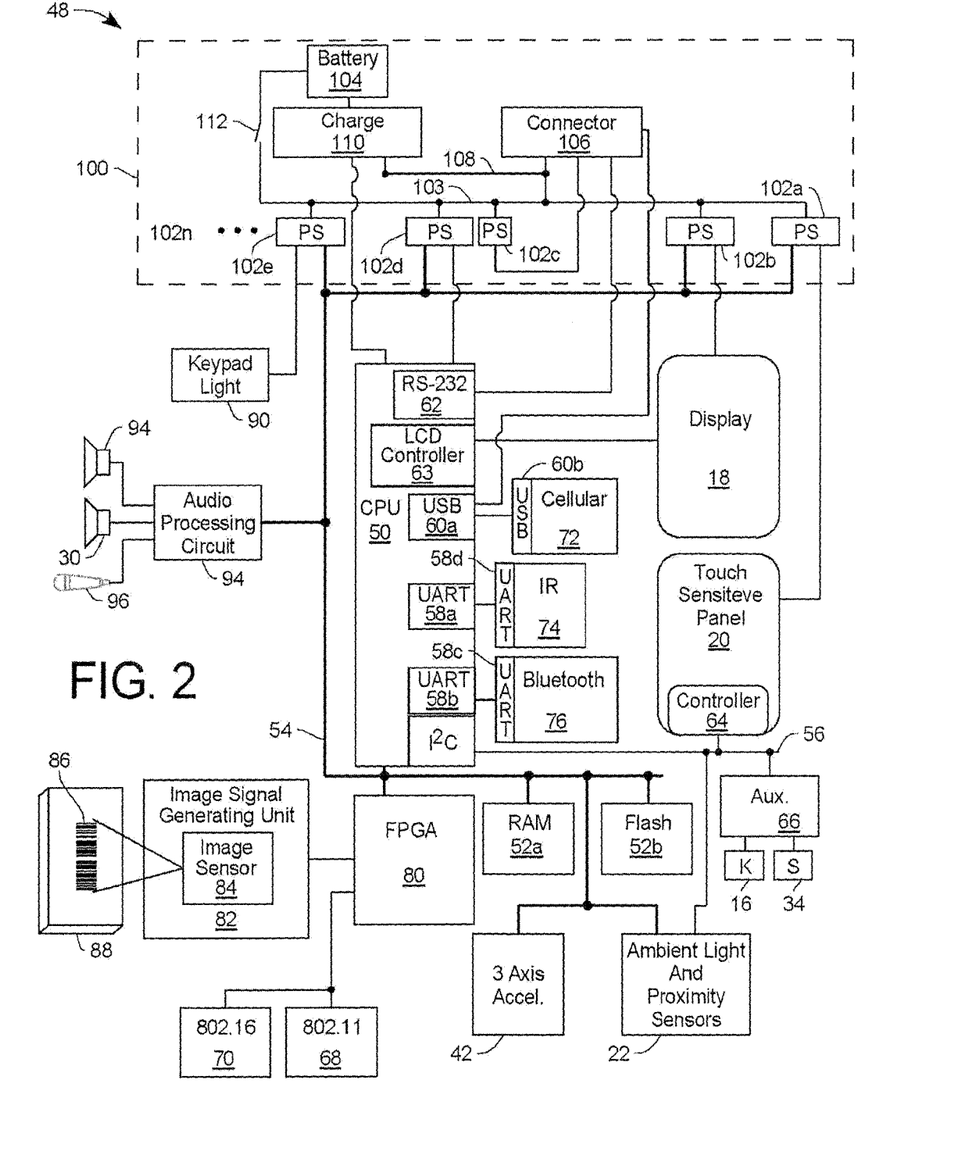
FIG. 2 is a block diagram of the DCD shown in FIG. 1.

FIG. 2 is a block diagram 48 of the DCD 10 shown in FIG. 1. Those of ordinary skill in the art will recognize that the illustrated design of the DCD 10 has been simplified so as to permit a briefer explanation of systems and components not directly related to the present invention.

A central processing unit (CPU) 50 receives data from and outputs data to other sub-systems for storage, transmission and additional processing. CPU 50 may be implemented using any number of off the shelf solutions including: embedded processors; general purpose processors; any number of RISC processors; or any number of custom solutions including pre-configured floating point gate arrays (FPGAs); and application specific integrated circuits (ASICs). Overall operation of the CPU 50 is controlled by software or firmware, typically referred to as an operating system which may be stored in one or more memory locations $52n$, including RAM 52a and FLASH memory 52b. Examples of suitable operating systems for DCD 10 include SYMBIAN: WINDOWS MOBIL, WINDOWS CE, WINDOWS XP, LINUX, PALM, and OSX.

In general, communication to and from the CPU 50 and among the various sub-components takes place via one or more ports or busses, including a main system bus 54, and I²C bus 56; a plurality of Universal Asynchronous Receivers/Transmitter (UART) ports 58n, Universal Serial Busses (USB) 60n, and a RS-232 port 62.

The illustrated CPU 50 is coupled to the display 18 through a LCD controller 63 and to the touch sensitive panel 20 which has an integrated controller 64. The combination of the display 18 and the touch sensitive panel 20 is often referred to as a "touch screen." The touch sensitive panel 20 may be in communication with the CPU 50 and an auxiliary processor 66 via the I²C bus 56.

The DCD 10 may further include a plurality of wireless communication links such as an 802.11 communication link 68, an 802.16 communication link 70, a communication link 72 for telephone (phone) communication with a cellular network such as a network in accordance with the Global System for Mobile Communications (GSM) or one that conforms to the Code Division Multiple Access (CDMA) standard, an IR communication link 74, and/or a Bluetooth communication link 76. Each of these links facilitates communication with a remote device and may be used to transfer and receive data. Other possible links include: an 802.15.4 link, a UMTS link, and a HSPDA link.

A variety of secondary processors may be provided to perform general and application specific functions. The example illustrated in FIG. 2 provides two such processors: a field programmable gate array (FPGA) 80 and the auxiliary processor 66. The FPGA 80 may comprise any of a number of FPGAs including the Virtex-4 family of FPGAs available from XILINX. The auxiliary processor 66 may comprise any of a number of embedded (or general purpose) processors, including one of the AVR RISC processors available from ATMEL CORPORATION.

The auxiliary processor 66 may interface with a variety of data input devices including, for example, the keypad 16 and the scan key 34. By way of example, the DCD 10 may be configured so that displayed menu options are selected by physically depressing a key on the keypad 16 or activating the touch screen 20 with use of a finger or stylus. The scan key 34 may be used for initiating and controlling one or more data collection systems, such as an image signal generating system 82. Although not shown in FIG. 2, the DCD 10 may also contain an RFID sensing system and a magnetic strip reader which may be initiated with the scan key 34.

The data collection system (e.g. the image signal generating system 82) may be controlled by the FPGA 80. In this case, the FPGA 80 initiates and controls the operation of the data collection systems and accumulates data received there from prior to depositing such data in memory 52n. Possible configurations of FPGA 80 are illustrated in U.S. Pat. No. 6,947,612 incorporated herein by reference. The image signal generating system 82 generally comprises a solid state image sensor 84 useful for imaging bar code 86 on a package 88.

The three axis accelerometer 42 and the ambient light and proximity sensors 22 are coupled to the main system bus 54. The three axis accelerometer may be made by Analog Devices, and the combination ambient light sensor and proximity sensor made by Intersil Corp. The DCD 10 may include a keypad light 90 used to illuminate the keypad 16.

An audio processing circuit 92, connected to the main system bus 54, drives a speaker 94, located on the back of the DCD 10, used when the DCD 10 is in a speakerphone or hands free mode, the handset speaker 30, and a microphone 96 which may be located on a side of the DCD 10.

A power circuit 100 is supplied for the controlling supplying of power to the DCD 10. The power circuit 100 generally comprises a series of power supplies 102n that regulate the power supplied to the various components of the DCD 10. Each power supply 102n generally comprises a step up or step down circuit connected to each of the various components in the DCD 10 that require the particular voltage output by that power supply 102n. In particular, the CPU 50 receives power form a power supply 102d, the display 18 receives power from the power supply 102b, the touch sensitive panel 20 receives power from the power supply 102a, and the keypad light 90 receives power from a power supply 102e. Although separate power supplies, 102a, 102b, and 102e, are shown to provide power to the touch sensitive panel 20, the display 18, and the keypad light 90, respectively, two or more of these power supplies may be combined and drive two or more of these components.

The power supplies 102n receive electricity from a power bus 103 which is, in turn, supplied by a battery 104 or may be supplied by a second power input on the connector 106. A connector 106 may comprise any number of known connection technologies, such as the D (or sub-D) Series of circular plastic connectors or the HCL D-sub derivative design data transfer connector. Certain pins of the connector 106 may be dedicated to receiving DC power, while other pins are dedicated to one or more communication paths, e.g. RS-232 and USB. It may also prove advantageous to provide DC power out, for example from a power supply 102c, so as to power tethered accessories, such as external magnetic stripe or RFID readers (not shown).

The battery 104 may be selected from any of a variety of battery technologies including fuel cell, NiMh, NiCd, Li Ion, or Li Polymer. The battery 104 is charged by a charge circuit 110 which receives power from the connector 106. The charge circuit 110 may comprise any of a number of available circuits.

A switch 112 isolates the battery based upon the presence of power from the connector 106. Thus, when an external power supply is connected to the connector 106, the switch 112 is opened and the battery is isolated from the power supplies 102n and may be charged via the charge circuit 110. Once power is removed from the connector 106, the battery is connected to the power supplies 102n.

The power consumption of any system in a sleep state may vary based on the system and sleep routines associated therewith. For example, a CPU may have a plurality of sleep states each of which has a different power profile and active functions. Accordingly, as used herein, the term sleep state will generally refer to a state in which one or more components or functions of a system or sub-subsystem are inactivated or limited in a manner known in the art by software in the CPU 50 so as to reduce power consumption.

Figure 3A:
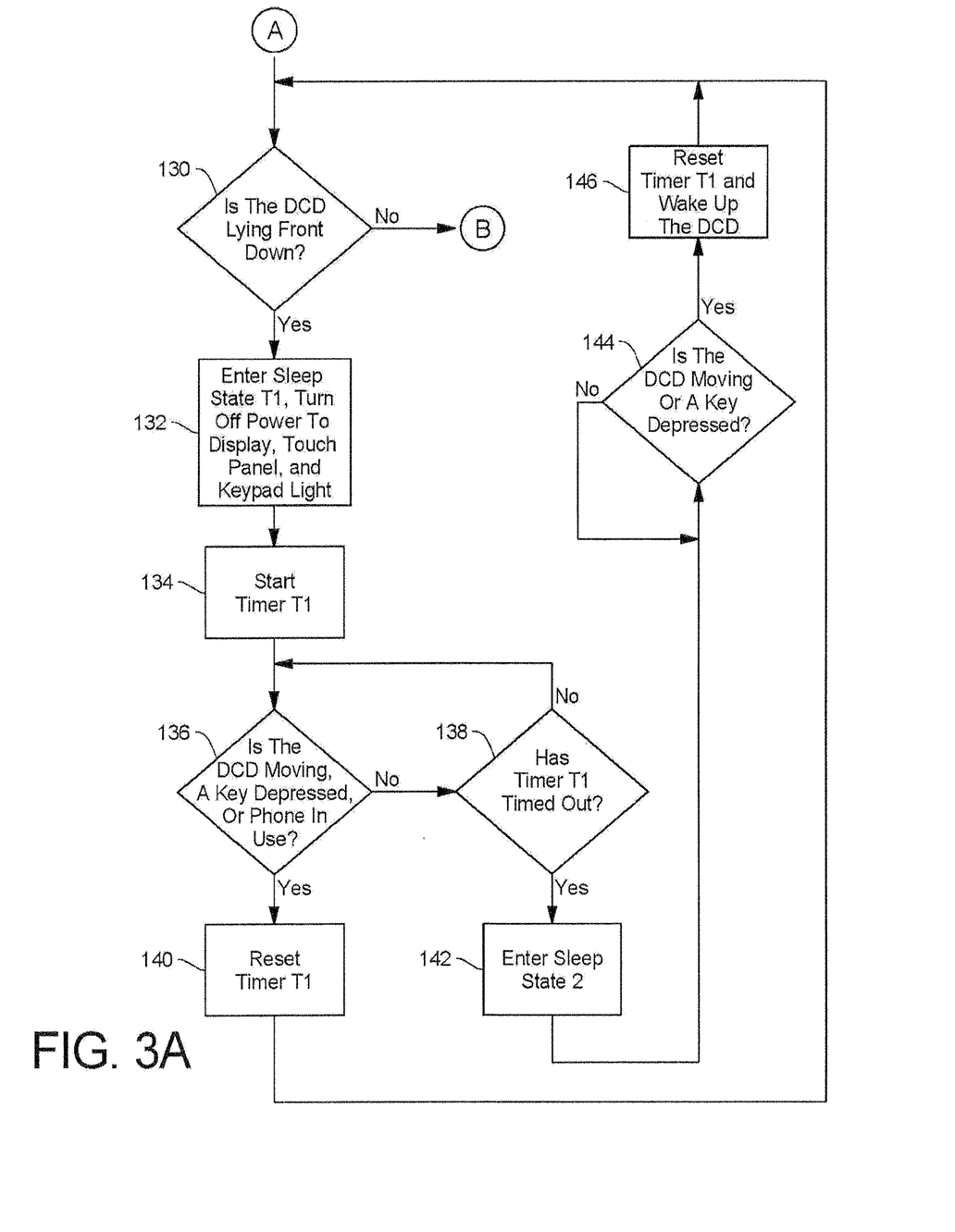
FIGS. 3A, 3B, and 3C are flow charts according to an embodiment of a process for power management which may be used in the DCD shown in FIG. 1.
Figure 3B:
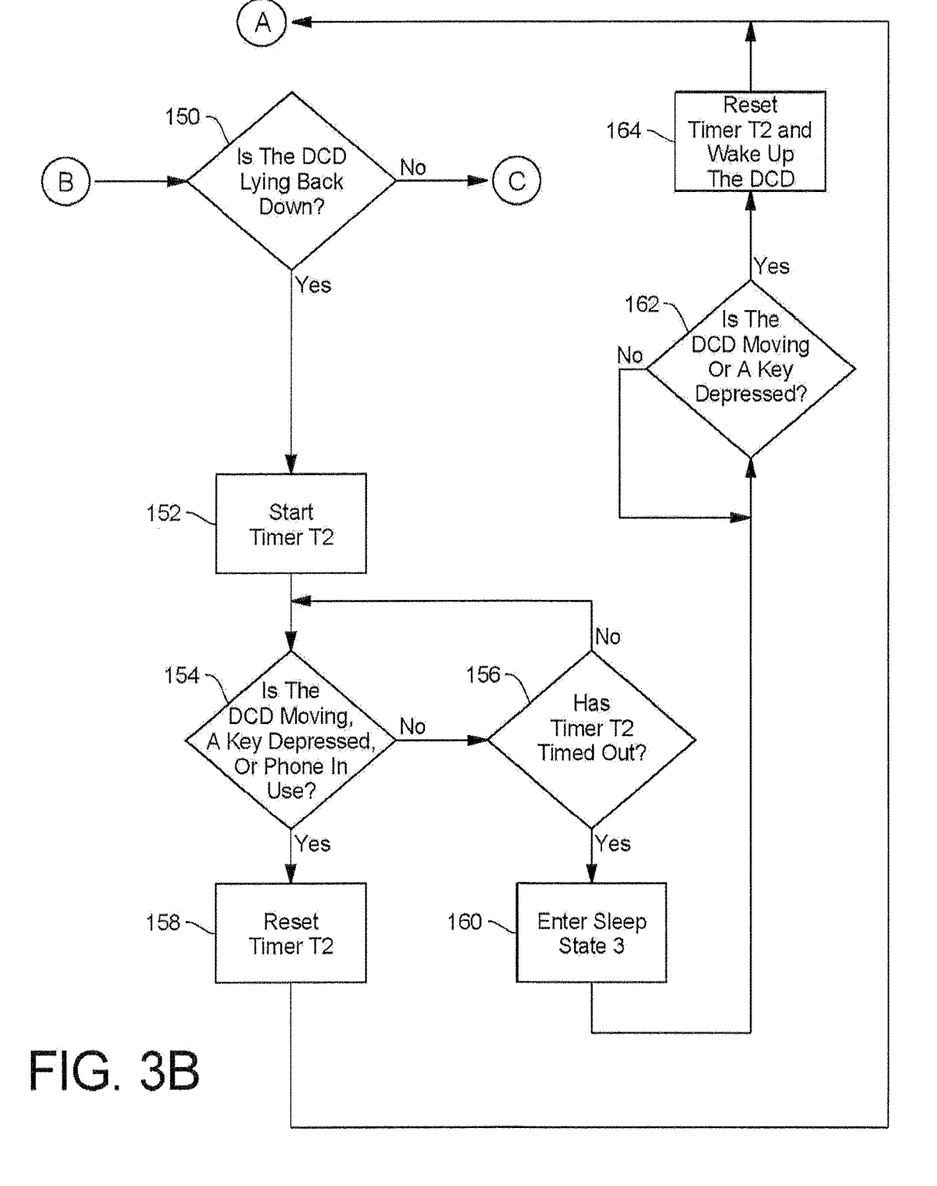
Figure 3C:
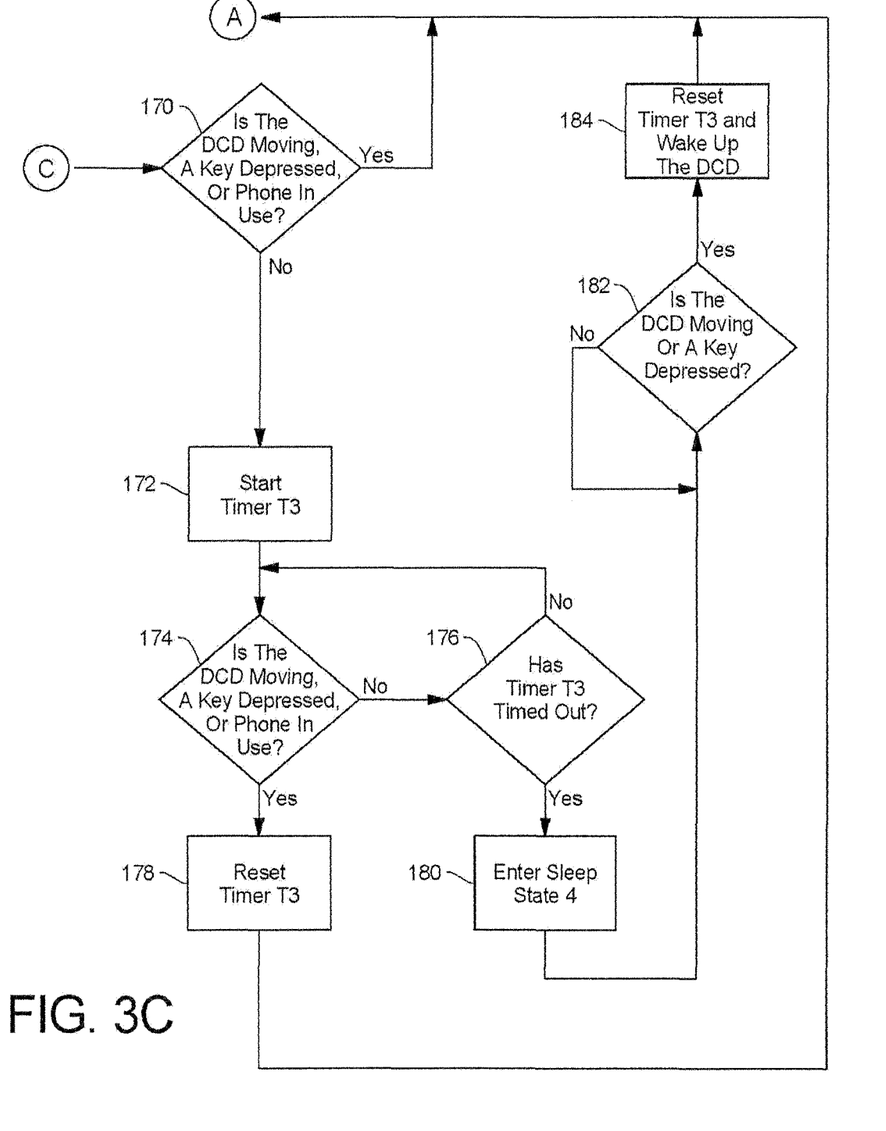

FIGS. 3A, 3B, and 3C are flow charts according to one embodiment of a process for power management which may be used in the DCD shown in FIG. 1. Beginning at letter A in FIG. 3A, with timers T1, T2, and T3 set to zero, the three axis accelerometer 42 detects if the DCD 10 has been put front down in decision block 130. The term "front down" means that the three axis accelerometer detects the earth's gravity in the positive Z direction indicated in FIG. 1, and essentially no pull of gravity in either the X or Y directions. If the DCD 10 is not front down, then the flow chart of FIG.

3A branches to letter B which continues in FIG. 3B. If the DCD 10 is lying front down then, because the display 18 and keypad 16 are not in use, the display 18, touch sensitive panel 20 and keypad light 90 are turned off to put the DCD 10 into a first sleep state as shown in block 132. There may be a short delay before the first sleep state is activated after the DCD 10 is turned front down to avoid entering a low power state inadvertently. Then a first timer T1 is started as shown in block 134. The timer T1 may be implemented by starting the timer with a predetermined time, and once started, decremented until the timer T1 times out by reaching zero. After the timer T1 has started the three axis accelerometer 42, the keypad 16, and the phone in the DCD 10 are monitored to detect if the DCD 10 is moving, whether a key on the keypad 16 is depressed, or whether the phone in the DCD is in use in decision block 136. If none of these events has occurred, then the timer T1 is checked to see if it has timed out in decision block 138. If not then the state of the DCD 10 passes to the decision block 136. Thus the three axis accelerometer 42, the keypad 16, and the phone in the DCD 10 are monitored to detect if the DCD 10 is moving, whether a key on the keypad 16 is depressed, or whether the phone in the DCD is in use during the time that the timer T1 is operating.

If, during the period of time that the DCD 10 is monitoring the three axis accelerometer 42, the keypad 16, and the use of the phone in the DCD 10 in decision block 136, if the DCD 10 is moved, a key on the keypad 16 is depressed, or the phone in the DCD is in use, then timer T1 is reset in block 140, and the state of the DCD 10 passes from block 140 to decision block 130.

If the timer T1 has timed out in decision block 138, then the DCD 10 will enter sleep state 2 as indicated in block 142. Once the DCD 10 is in sleep state 2 the three axis accelerometer 42 and the keypad 16 are monitored to determine if the DCD 10 is moving or if a key on the key pad 16 has been depressed as indicated in decision block 144. If the DCD 10 is moved or a key depressed, then the DCD 10 is woken up to allow normal operation, and the timer T1 is reset as indicated in block 146. The state of the DCD 10 then passes to the decision block 130.

If the DCD10 is not lying front down when the test in decision block 130 is made, then state of the DCD 10 passes to the decision block 150 in FIG. 3B. In decision block 150 the three axis accelerometer 42 detects if the DCD 10 has been put back down. If not then the flow chart of FIG. 3B branches to letter C which continues in FIG. 3C. If the DCD 10 is lying back down then a second timer T2 is started as shown in block 152. The timer T2 may be implemented by starting the timer with a predetermined time, and once started, decremented until the timer T2 times out by reaching zero. After the timer T2 has started the three axis accelerometer 42, the keypad 16, and the phone in the DCD 10 are monitored to detect if the DCD 10 is moving, whether a key on the keypad 16 is depressed, or whether the phone in the DCD is in use in decision block 154. If none of these events has occurred, then the timer T2 is checked to see if it has timed out in decision block 156. If not then the state of the DCD 10 passes to the decision block 154. Thus the three axis accelerometer 42, the keypad 16, and the phone in the DCD 10 are monitored to detect if the DCD 10 is moving, whether a key on the keypad 16 is depressed, or whether the phone in the DCD is in use during the time that the timer T2 is operating.

If, during the period of time that the DCD 10 is monitoring the three axis accelerometer 42, the keypad 16, and the use of the phone in the DCD 10 in decision block 136, if the DCD 10 is moved, a key on the keypad 16 is depressed, or the phone in the DCD is in use, then timer T2 is reset in block 158, and the state of the DCD 10 passes from block 158 to decision block 130 in FIG. 3A.

If the timer T2 has timed out in decision block 156, then the DCD 10 will enter sleep state 3 as indicated in block 160. Once the DCD 10 is in sleep state 3 the three axis accelerometer 42 and the keypad 16 are monitored to determine if the DCD 10 is moving or if a key on the key pad 16 has been depressed as indicated in decision block 162. If the DCD 10 is moved or a key depressed, then the DCD 10 is woken up to allow normal operation, and the timer T2 is reset as indicated in block 164. The state of the DCD 10 then passes to the decision block 130 in FIG. 3A.

If the DCD10 is not lying back down when the test in decision block 150 is made, then the state of the DCD 10 passes to the decision block 170 in FIG. 3C. In decision block 170 the three axis accelerometer 42, the keypad 16, and the phone in the DCD 10 are monitored to detect if the DCD 10 is moving, whether a key on the keypad 16 is depressed, or whether the phone in the DCD is in use. If the DCD 10 is moving, a key on the keypad 16 is depressed, or the phone in the DCD is in use, then the flow chart of FIG. 3C branches to decision block 130 in FIG. 3A. If the DCD 10 is not moving, if none of the keys on the keypad 16 is depressed, and if the phone in the DCD is not in use, then a third timer T3 is started as shown in block 172. The timer T3 may be implemented by starting the timer with a predetermined time, and once started, decremented until the timer T3 times out by reaching zero. After the timer T3 has started the three axis accelerometer 42, the keypad 16, and the phone in the DCD 10 are monitored to detect if the DCD 10 is moving, whether a key on the keypad 16 is depressed, or whether the phone in the DCD is in use in decision block 174. If none of these events has occurred, then the timer T3 is checked to see if it has timed out in decision block 176. If not then the state of the DCD 10 passes to the decision block 174. Thus the three axis accelerometer 42, the keypad 16, and the phone in the DCD 10 are monitored to detect if the DCD 10 is moving, whether a key on the keypad 16 is depressed, or whether the phone in the DCD is in use during the time that the timer T3 is operating.

If, during the period of time that the DCD 10 is monitoring the three axis accelerometer 42, the keypad 16, and the use of the phone in the DCD 10 in decision block 136, if the DCD 10 is moved, a key on the keypad 16 is depressed, or the phone in the DCD is in use, then timer T3 is reset in block 158, and the state of the DCD 10 passes from block 158 to decision block 130 in FIG. 3A.

If the timer T3 has timed out in decision block 176, then the DCD 10 will enter sleep state 4 as indicated in block 180. Once the DCD 10 is in sleep state 4 the three axis accelerometer 42 and the keypad 16 are monitored to determine if the DCD 10 is moving or if a key on the key pad 16 has been depressed as indicated in decision block 182. If the DCD 10 is moved or a key depressed, then the DCD 10 is woken up to allow normal operation, and the timer T3 is reset as indicated in block 184. The state of the DCD 10 then passes to the decision block 130 in FIG. 3A.

By way of example, the DCD 10 may be put front down and enter into sleep state 1, and, after the timer T1 has timed out, enter sleep state 2. Then, after the DCD 10 has been used, the DCD 10 may be put back down and, after timer T2 has timed out, enter sleep state 3. Then after the DCD 10 has been used again, the DCD 10 may be put in a position which is neither front down or back dawn, and, after timer T3 has timed out, enter into sleep state 4.

Although the timers T1, T2, and T3 are shown and described as separate timers, one or two timers may be used for timers T1, T2, and T3. Similarly, although the sleep states 2, 3, and 4 are shown and described as separate sleep states, one or two sleep states may be used for sleep states 2, 3, and 4.

The time out times of the timers T1, T2, and T3 is made considering the power to be saved and whether a user would find the time out times so short as to be a nuisance. For example a time out time which is short enough to put the DCD 10 in a sleep state when a user puts the DCD 10 down long enough to move a package would be an inconvenience to the user since the user would have to wait for the DCD 10 to wake up. In addition to the sleep times shown in FIGS. 3A, 3B, and 3C, the operating system software used in the DCD 10 may include an inactivity timer that puts the DCD 10 into a sleep state when the operating system detects that there has not been any activity for a predetermined time. For example, the operating system might have an inactivity timer set for 10 minutes, while the time T1 may be set for one minute, the timer T2 set for 5 minutes, and the timer T3 set for 8 minutes. Thus if the DCD 10 is not used while in a moving vehicle the operating system inactivity timer would put the DCD10 in a sleep state after 10 minutes.

Figure 4:
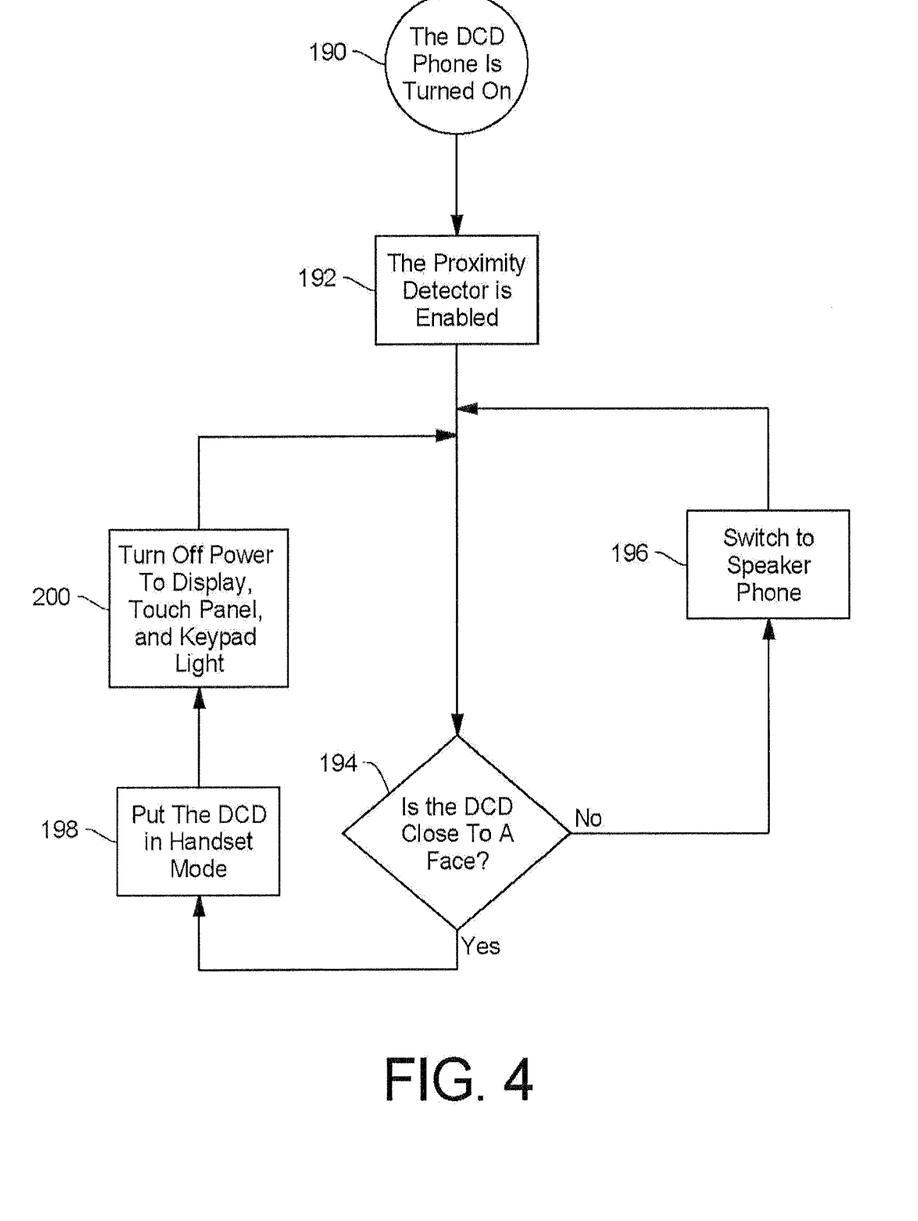
FIG. 4 is a flow chart according to another embodiment of a process for power management which may be used with the DCD shown in FIG. 1.

FIG. 4 is a flow chart showing another process for power management which may be used with the DCD 10. FIG. 4 also shows a process for automatically switching the DCD phone between handset mode and speakerphone mode. The process shown in FIG. 4 begins when the DCD 10 phone is turned on as indicated by circle 190. When the DCD 10 phone is turned on the proximity sensor portion of the combination ambient light sensor and proximity sensor 22 is enabled. The proximity sensor portion includes the LED 24 and the combination photodiode array and optical filter 28. Since the LED 24 draws a not insignificant amount of current when turned on, it may only be enabled when the DCD 10 phone is in use, and the proximity portion may be turned on and off periodically when the DCD 10 phone is in use to further conserve power in the DCD 10.

After the proximity detection portion is enabled, a determination is made in decision block 194 whether the DCD 10 is close to a user's face as generally would be the case if the DCD 10 phone was used as a handset. If the DCD 10 phone is not close to a user's face, the DCD 10 is then switched to the speakerphone mode if it was in the handset mode before as shown in block 196. In which case the handset speaker 94 would be disabled and the speakerphone speaker 30 would be enabled. Then the proximity detector portion is used again to determine if the DCD 10 is close to a user's face in decision block 194.

If the proximity detection portion determines that the phone is close to a user's face, then the DCD 10 phone is switched to the handset mode if it was in the speakerphone mode before as shown in block 198 to disable the speakerphone speaker 30 and enable the handset speaker 94. Then the power to the display 18, the touch sensitive panel 20, and the keypad light 90 is turned off. The power to the touch panel 20 is turned off to not only save power but to also prevent the DCD 10 from performing an unwanted operation caused by the touch sensitive panel 20 touching a user's cheek while the user is using the phone in the handset mode. Then the proximity detector portion is used again to determine if the DCD 10 is close to a user's face in decision block 194.

The threshold set for the proximity detector for determining if the DCD 10 is close to a user's face depends of the infrared reflectance of a user's face, the color of a user's hair, etc.

Figure 5:
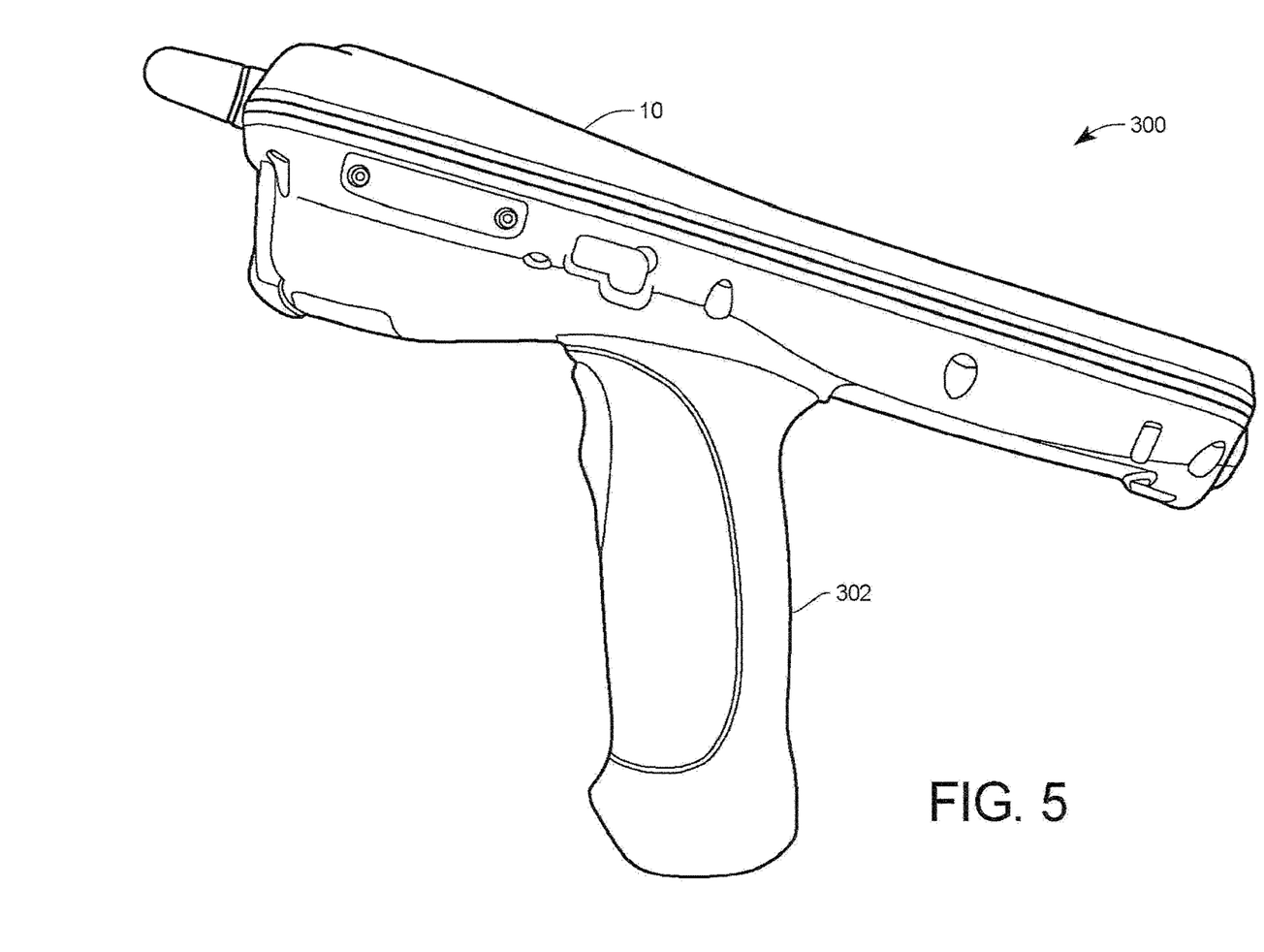
FIG. 5 is a side view of a DCD according to another embodiment of the present invention.

FIG. 5 is a side view of another DCD 300 according to another embodiment of the present invention. The DCD 300 may be the DCD 10 with a handle 302 attached. The handle does not allow the DCD 300 to be put down on its back side, but instead may be put down leaning on a side edge of the DCD 10 and the end of the handle 302.

Figure 6:
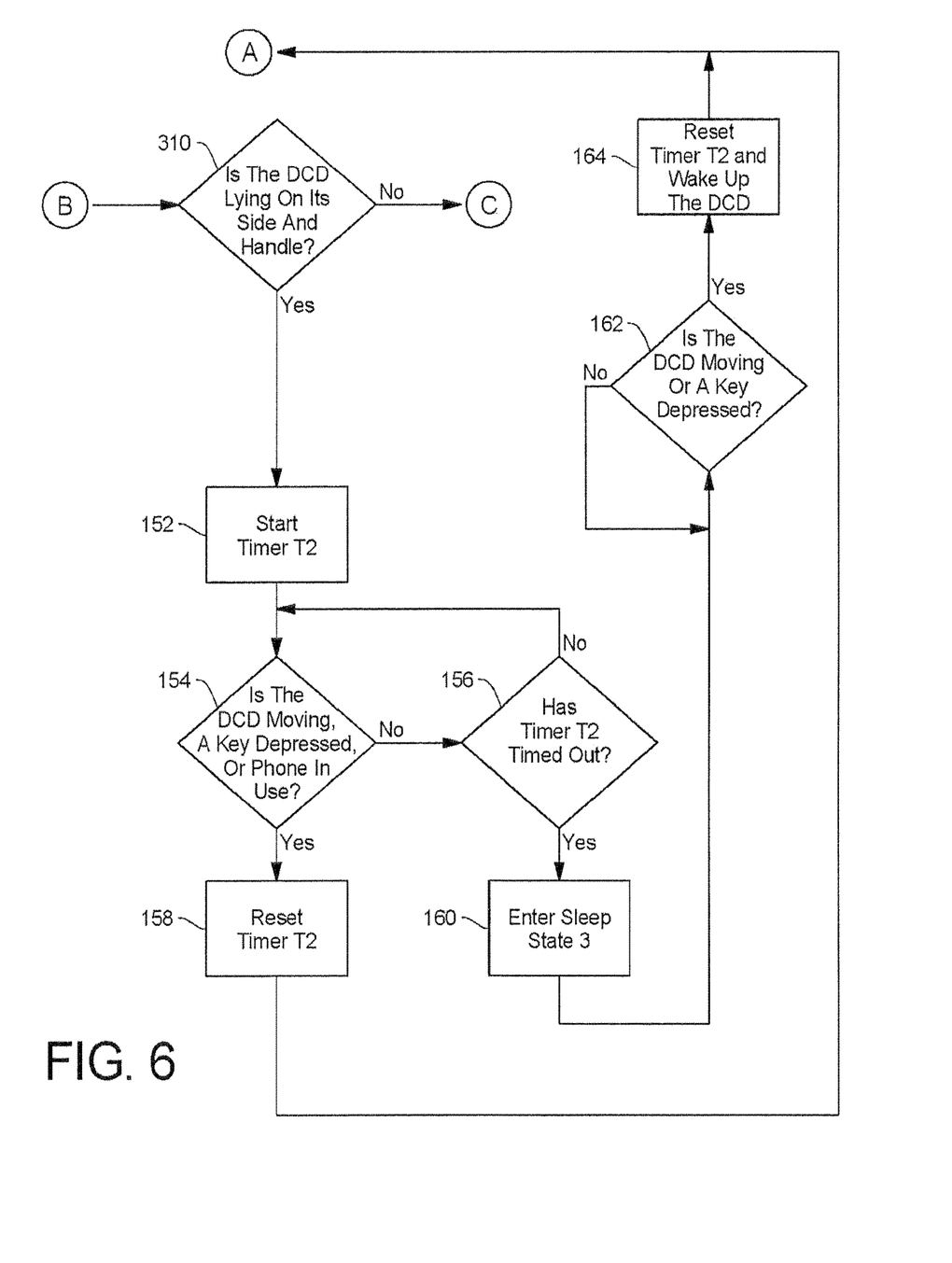
FIG. 6 is a flow chart according to an embodiment of a process for power management which may be used with the DCD shown in FIG. 5.

FIG. 6 is a flow chart showing a process for power management which may be used with the DCD 300. FIG. 6 is FIG. 3B with decision block 310 substituted for decision block 150 in FIG. 3B. Thus the software used to detect if the DCD 10 in back side down in the process shown in FIG. 3B would be modified to recognize that either of the two leaning positions of the DCD 300 is equivalent to the DCD 10 lying back down. In some uses of the DCD 300 the DCD 300 may often be stored in another orientation such as with the top edge facing down as when the DCD 300 is stored between a handle on a cart and an edge of the cart. The software could be modified to recognize this orientation as equivalent to the DCD 10 lying back down.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A device, comprising:
   a main body having a front and a back;
   a touch screen on the front of the main body;
   an accelerometer within the main body for detecting movement and an orientation of the device; and
   a processor within the main body configured for:
   determining if the device is front down or back down;
   if the device is front down, placing the device in a first sleep state and then a second sleep state based on a time elapsed without detecting movement of the device or receiving input since the device was placed in the first sleep state; and
   if the device is back down, placing the device in a third sleep state and then a fourth sleep state based on a time elapsed without detecting movement of the device or receiving input since the device was placed in the third sleep state.

2. The device of claim 1, comprising a proximity sensor within the main body for detecting the device's proximity to other objects, wherein the processor is configured for placing the device in a reduced power state in response to detecting, with the proximity sensor, that the device is close to a user's face.

3. The device of claim 1, wherein the processor is configured for, when the device is front down, placing the device in the second sleep state after a first predetermined time period in the first sleep state.

4. The device of claim 1, wherein the processor is configured for, when the device is back down, placing the device in the fourth sleep state after a second predetermined time period in the third sleep state.

5. The device of claim 1, wherein the processor is configured for:
when the device is neither front down nor back down, placing the device in the third sleep state and then the fourth sleep state based on a time elapsed without detecting movement of the device or receiving input since the device was placed in the second sleep state; and
when the device is neither front down nor back down, placing the device in the fourth sleep state after a third predetermined time period in the third sleep state.

6. The device of claim 1, wherein:
the processor is configured for, when the device is front down, placing the device in the second sleep state after a first predetermined time period in the first sleep state;
the processor is configured for, when the device is back down, placing the device in the fourth sleep state after a second predetermined time period in the third sleep state;
the processor is configured for, when the device is neither front down nor back down, placing the device in the third sleep state and then the fourth sleep state based on a time elapsed without detecting movement of the device or receiving input since the device was placed in the second sleep state; and
the processor is configured for, when the device is neither front down nor back down, placing the device in the fourth sleep state after a third predetermined time period in the third sleep state;
the second predetermined time period is longer than the first predetermined time period; and
the third predetermined time period is longer than the second predetermined time period.

7. The device of claim 1, wherein the processor is configured for turning off the touch screen when placing the device in the first sleep state.

8. The device of claim 1, wherein the processor is configured for turning off the touch screen when placing the device in the first sleep state.

9. The device of claim 1, wherein the processor is configured for inactivating more device functions in the third sleep state than in the first sleep state.

10. The device of claim 1, wherein the processor is configured for inactivating more device components in the third sleep state than in the first sleep state.

11. A device, comprising:
a main body having a front and a back;
a touch screen on the front of the main body;
a proximity sensor within the main body for detecting the device's proximity to other objects;
an accelerometer within the main body for detecting movement and an orientation of the device; and
a processor within the main body configured for:
determining if the device is front down, back down, or neither front down nor back down;
if the device is front down, placing the device in a first sleep state and then a second sleep state based on a time elapsed without detecting movement of the device or receiving input since the device was placed in the first sleep state;
if the device is back down, placing the device in a third sleep state and then a fourth sleep state based on a time elapsed without detecting movement of the device or receiving input since the device was placed in the third sleep state; and if the device is neither front down nor back down, placing the device in the third sleep state and then the fourth sleep state based on a time elapsed without detecting movement of the device or receiving input since the device was placed in the third sleep state.

12. The device of claim 11, wherein the processor is configured for placing the device in a reduced power state in response to detecting, with the proximity sensor, that the device is close to a user's face.

13. The device of claim 11, wherein the processor is configured for, when the device is front down, placing the device in the second sleep state after a first predetermined time period in the first sleep state.

14. The device of claim 11, wherein the processor is configured for, when the device is back down, placing the device in the fourth sleep state after a second predetermined time period in the third sleep state.

15. The device of claim 11, wherein the processor is configured for, when the device is neither front down nor back down, placing the device in the fourth sleep state after a third predetermined time period in the third sleep state.

16. The device of claim 11, wherein:
the processor is configured for, when the device is front down, placing the device in the second sleep state after a first predetermined time period in the first sleep state;
the processor is configured for, when the device is back down, placing the device in the fourth sleep state after a second predetermined time period in the third sleep state;
the processor is configured for, when the device is neither front down nor back down, placing the device in the fourth sleep state after a third predetermined time period in the third sleep state;
the second predetermined time period is longer than the first predetermined time period; and
the third predetermined time period is longer than the second predetermined time period.

17. A device, comprising:
a main body having a front and a back;
a touch screen on the front of the main body;
a keypad on the front of the main body;
an accelerometer within the main body for detecting movement and an orientation of the device; and
a processor within the main body configured for:
determining if the device is front down or back down;
if the device is front down, placing the device in a first sleep state and then a second sleep state based on a time elapsed without detecting movement of the device or receiving input since the device was placed in the first sleep state; and
if the device is back down, placing the device in a third sleep state and then a fourth sleep state based on a time elapsed without detecting movement of the device or receiving input since the device was placed in the third sleep state.

18. The device of claim 17, wherein the processor is configured for turning off the touch screen when placing the device in the first sleep state.

19. The device of claim 17, wherein the processor is configured for turning off the keypad when placing the device in the first sleep state.

20. The device of claim 17, wherein the processor is configured for inactivating more device functions in the third sleep state than in the first sleep state.

* * * * *